United States Patent
Hiraoka et al.

[15] 3,682,265
[45] Aug. 8, 1972

[54] MAGNET VEHICLE

[72] Inventors: Michito Hiraoka, Ageo; Yoshihiko Hikita, Fukaya, both of Japan

[73] Assignee: Hitachi Metals, Ltd., Tokyo, Japan

[22] Filed: May 13, 1970

[21] Appl. No.: 36,753

[30] Foreign Application Priority Data

May 16, 1969  Japan ..................... 44/37383
Aug. 1, 1969  Japan ..................... 44/60410

[52] U.S. Cl. ................. 180/9.2 R, 114/222, 335/296
[51] Int. Cl. ............................................... B62d 55/00
[58] Field of Search .......... 180/6.2, 6.7, 1 VS, 9.2 R; 114/222; 335/229, 296

[56] References Cited

UNITED STATES PATENTS

| | | |
|---|---|---|
| 2,132,661 | 10/1938 | Temple.................114/222 X |
| 2,895,429 | 7/1959 | Baermann.............46/240 UX |
| 1,362,518 | 12/1920 | Villiers......................114/222 |
| 1,960,595 | 5/1934 | Poe..........................105/77 X |
| 2,030,840 | 2/1936 | Allen.......................180/1 VS |
| 2,118,276 | 5/1938 | Temple......................114/222 |
| 3,088,429 | 5/1963 | Johannessen..............114/222 |

*Primary Examiner*—Benjamin Hersh
*Assistant Examiner*—John A. Pekar
*Attorney*—Craig, Antonelli, Stewart and Hill

[57] ABSTRACT

A magnet vehicle supportedly adhered to and adapted to run over an inclined wall surface of a structural member made of a strong magnetic material such as iron and steel, characterized in that said vehicle can be altered of its direction of travel as desired on said surface.

6 Claims, 8 Drawing Figures

INVENTOR
MICHITO HIRAOKA
YOSHIHIKO HIKITA

BY Craig, Antonelli, Stewart & Hill

ATTORNEYS

INVENTOR
MICHITO HIRAOKA
YOSHIHIKO HIKITA

BY Craig, Antonelli, Stewart + Hill

ATTORNEYS

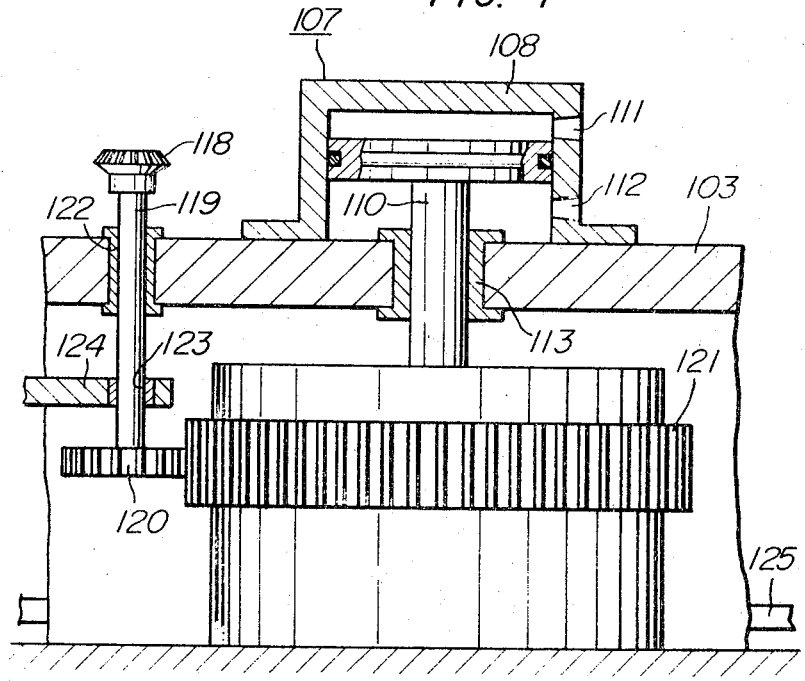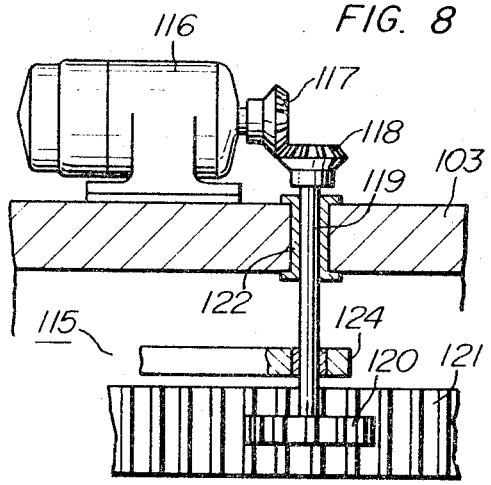

# 3,682,265

MAGNET VEHICLE

The present invention relates to a magnet vehicle supportedly adhered to a vertical or inclined wall surface of a structural member of a magnetic material such as iron and steel and adapted to travel over said surface for various operations such as painting, inspection of welded portions and so on, various devices for such purposes being mounted thereon.

Heretofore, it has been necessary to construct platform for operators by, for example, combining wooden bard or rods, or otherwise to suspend gondola or cradle or the like from above, when painting or inspecting ships or large buildings. Thus, the operators had to work by hand on such platform or in such gondola located at a considerable height. For this reason, the operation was dangerous and, in addition to this, the efficiency of operation was extremely low.

To overcome the above disadvantages, various magnet vehicles have been proposed. However, such magnet vehicles heretofore proposed have proved to be not satisfactory, for example, in that, when the magnet vehicle is driven over a surface having a certain curvature in stead of a flat plane of a structural member, it was not possible to obtain a sufficient adhesion force for supporting its weight and further that it tended to sometimes damage the operation surface due to the contact pressure exerted between the vehicle and the operation surface. Thus, any satisfactory magnet vehicle has not been put to a practical use.

In case of magnet vehicles heretofore proposed, they are adhered to an operation surface by permanent magnet means and/or electromagnet means mounted thereon, and driven by driving or magnetic belts provided on both sides of the vehicle, which belts being driven by electric motors. In case of changing the direction of travel of the magnet vehicle of this type, it was done by driving only the belts located on one side of the vehicle, with the other belts located on the opposite side being stopped or reversely driven, whereby turning the magnet vehicle in a certain radius of turn. However, when the vehicle is supported on an almost vertical wall surface, it had the tendency of slipping at the contact area either of the right or left belts during the turn of the vehicle owing to the change in the contact pressure between the vehicle and the wall surface. Accordingly, remarkable skill was required to Accordingly, the magnet vehicle exactly in the desired direction, and it required a relatively large radius of turn and a long time to accomplish turning of the vehicle.

In accordance with the present invention, there is provided a magnet vehicle comprising central magnet means, lateral magnet means, the gap between the lower end of the central magnet means and an operation surface being adjusted in accordance with the curvature of said operation surface in order to maintain a predetermined adhesion force therebetween, driving endless belt means adapted to be driven by driving pulley means, take-up pulley means and guide pulley means mounted on frame members, planetary gear means associating with a gear fixedly secured to said central magnet means for altering the direction of travel of the magnet vehicle.

It is therefore a principal object of the present invention to provide a magnet vehicle in which the gap between the lower end of the magnet means and the operation surface of a structural member can be adjusted so as to maintain always an adhesion force sufficient for the weight of the magnet vehicle, and a sufficiently flexible material is used for the driving endless belts so that the operation surface of a structural member may not be damaged.

It is a second object of the present invention to provide a magnet vehicle in which the central electromagnet means may be moved downward relative to the under surface of the magnet vehicle when it is adhered to a structural member, removing the influence of the lateral magnet means upon the structural member so that the vehicle may be altered in its direction of travel with ease.

It is further a third object of the present invention to provide a magnet vehicle which can be supported on a structural member by the adhesion force only of the lateral magnet means when the electromagnet means is not activated.

It is furthermore a fourth object of the present invention to provide a magnet vehicle which can alter its direction of travel with high reliability, with ease, in a remarkably short while in comparison with the conventional ones and even in a considerably restricted area.

Another objects, features and advantages of the present invention will become apparent to those skilled in the art from the following detailed description and attached drawings on which, by way of example, only the preferred embodiments of the present invention are illustrated, in which;

FIGS. 7 and 8 are sectional views illustrating in detail a steering means incorporated in the magnet vehicle shown in FIG. 5.

Figure 1:
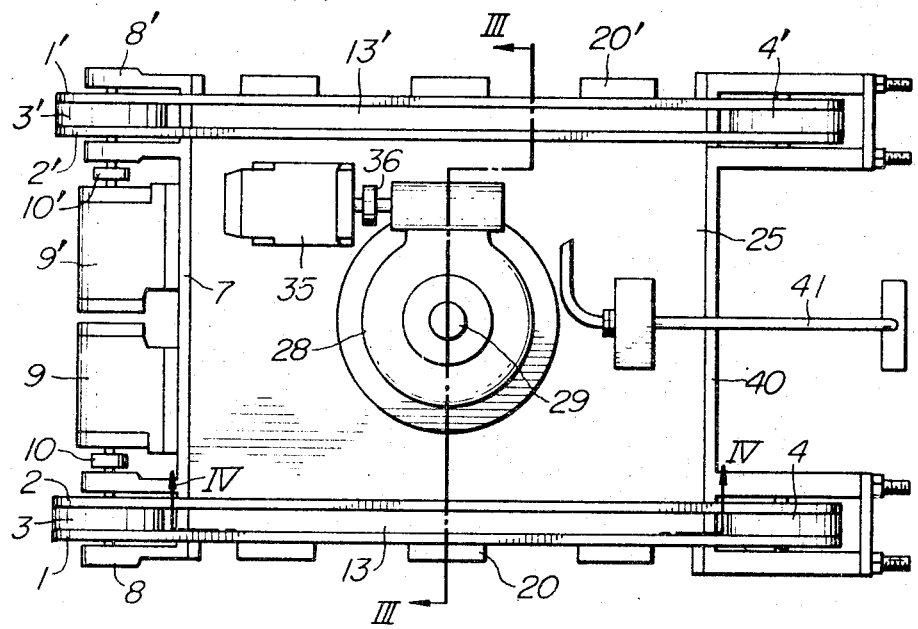
FIG. 1 is a plan view illustrating one embodiment of the magnet vehicle according to the present invention.
Figure 2:
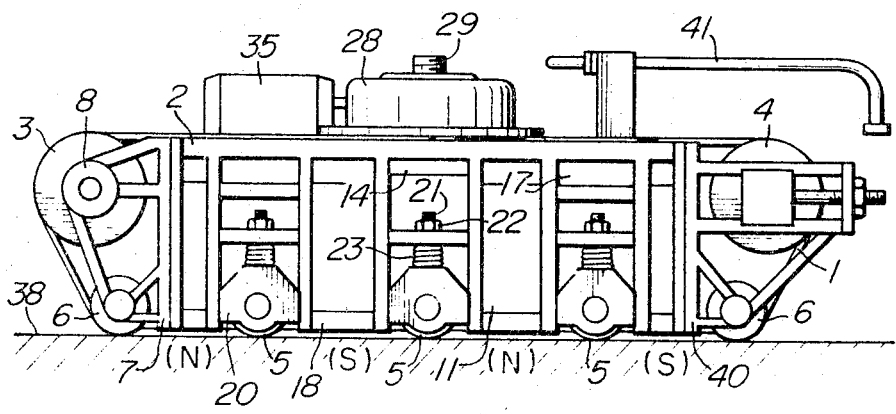
FIG. 2 is a side view of the vehicle shown in FIG. 1.
Figure 3:
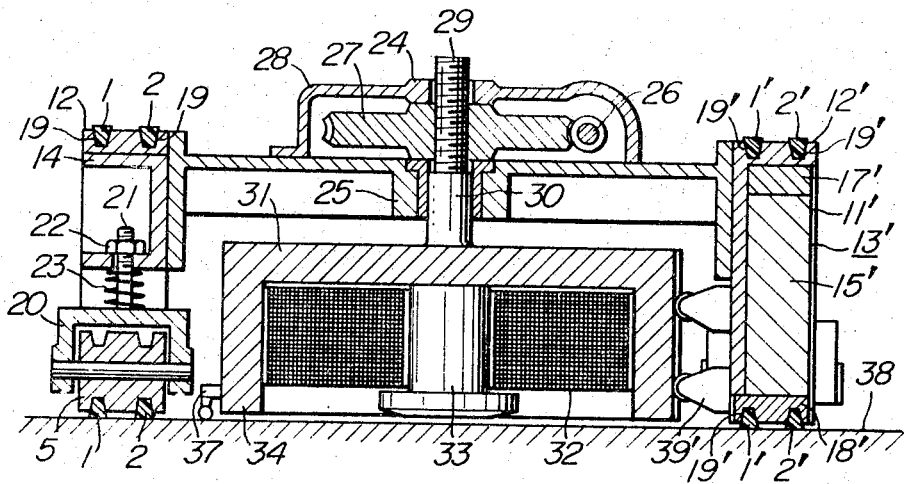
FIG. 3 is an enlarged view in section on the line III—III shown in FIG. 1.
Figure 4:
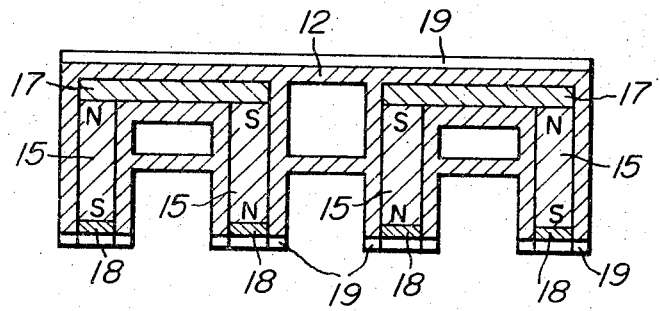
FIG. 4 is a longitudinal, sectional view illustrating lateral magnet means in detail.

One preferred embodiment of the present invention will now be described hereinunder merely by way of example with reference to FIGS. 1 through 4. In this specification it is contemplated that dashed reference numeral mean members disposed at the right-hand side with respect to the longitudinal center line of the vehicle.

1, 1' and 2, 2' are driving endless V-belts which are wound around drive pulleys 3, 3', take-up pulleys 4, 4', guide pulleys 5, 5' and small pulleys 6, 6' and adhered to the side wall or the under surface of the structural body 38 made of iron or steel and serve to drive the magnet vehicle. The aforementioned driving endless V-belts are driven through rotation of the driving pulleys 3, 3'. 7 is a support member for said driving pulleys of non-magnetic material. The driving pulleys supported in said support member 7 by means of bearings 8, 8' are associated with driving motors 9, 9' in said driving pulley support member 7 via couplings 10, 10', and they are driven independently by means of said driving motors 9, 9'.

The driving motors 9, 9' are operated by remote control means and are preferably of the electric or pneumatic type for the purpose of decreasing the weight of the vehicle. 11 and 11' are side wall members symmetrical with respect to the longitudinal axis of the vehicle, and comprise respectively lateral magnet means 13, 13' having frames 12, 12' of non-magnetic material and three pairs of guide pulleys 6, 6'.

The lateral magnet means 13, 13' consist respectively of frames 12, 12', permanent magnets 15, 15', upper heel pieces 17, 17' and lower heel pieces 18, 18', and there are provided guide grooves 19, 19' for receiving the driving belts 1, 1' and 2, 2' on the upper surfaces of the frames 12, 12' and on the lower surfaces of the lower heel pieces 18, 18', respectively.

The guide pulley means 14, 14' are provided in the frames 12, 12' in three pairs on the right and on the left of the vehicle, and comprise guide pulleys 5, 5', support frames 20, 20' for said guide pulleys, bolts 21, 21' for suspending the support frames 20, 20' from the frames 12, 12' and springs 23, 23' provided between said frames 12, 12' and said support frames 20, 20' and disposed around the bolts 21, 21' and nuts 22, 22'.

24 is a central magnet means which is comprised of upper frame 25, warm 26, warm wheel 27, cover 28 for these members, shaft 30 including a screw 29 adapted to be vertically displaced through the rotation of said warm wheel 27 n and magnet 31 fused to the lower end of said shaft 30. 32 is a coil, which is mounted within a yoke 34 by means of a shaft 33. 35 is a reduction and lift motor which is associated with the worm 26 via the coupling 36. A limit switch 37 is attached to the yoke 34 cooperating with the reduction and lift motor 35 so that the distance between the electromagnet 31 and the structural member 38 of iron or steel may be maintained constant. There are provided on the lateral frame 12, 12', a plurality of guide rollers 39, 39', respectively, so that the electromagnet 31 may be vertically moved along a suitable groove formed in the yoke 34 when it is moved upward or downward.

40 is a support frame of non-magnetic material for supporting the take-up pulleys 4, 4' and the small pulleys 6, 6'. The take-up pulleys 4, 4' are mounted thereon in the manner that their location may be adjusted with ease. 41 is a painting nozzle mounted on the upper frame 25.

Said driving pulley support frame 7, lateral frames 21, 12', upper frame 25 and support frame 40 are respectively interconnected with each other by suitable means such as bolts and nuts, and they constitute the magnet vehicle together with the aforementioned various elements and means.

The arrangement being as above, when the magnet vehicle is placed upon a side wall or under surface of the structural member 38 by means of suitable means such as crane, the lateral magnet means 13, 13' are adhered to the surface of the structural member 38 via the driving V-belts 1, 1' and 2, 2' guided by the grooves 19, 19' formed in the upper surface of the frames 12, 12' and the lower heel pieces 18, 18'. Subsequently, when the electromagnet 31 is activated by the limit switch 37 in association with the mechanism comprising the reduction and lift motor 35, coupling 36, warm 26, warm wheel 27, screw 29 and shaft 30, then the magnet vehicle is adhered to and firmly supported on a side wall or under surface of the structural member 38.

After the vehicle is adhered to and supported on the structural member, it is operated by means of remote control means (not shown) mounted on the vehicle and control board (not shown) provided on or away from the structural member 38. When it is required to advance the vehicle straight, it is accomplished by rotating the two driving motors 9 and 9' at the same speed, whereupon the driving pulleys 3 and 3' are rotated intermediary of the respective couplings 10 and 10' for advancing the driving V-belts 1, 1' and 2, 2'. When it is required to change the direction of advance, it is accomplished by driving only one of said two driving motors 9 and 9'.

During the movement of the vehicle, the entire weight of the vehicle and various devices mounted thereon is supported by either of or both of the central magnet means 24 and the lateral magnet means 13, 13'. It is preferable that the gap between the respective heel pieces 18, 18' of the lateral magnet means 13, 13' and the surface of the structural member 38 be in the magnitude of about 1–3 mm. Such magnitude of gap is achieved by the driving V-belts 1, 1' and 2, 2' fitted in the grooves 19, 19' formed in the heel pieces 18, 18'. The springs 23, 23' of the guide pulley means 14, 14' act in accordance with the curvature of the structural member 38 so that said gap between the lower surface of the heel pieces 18, 18' and the surface of the structural member 38 may be maintained constant.

In case of the central magnet means 24 on the other hand, it is also preferable to maintain the gap between the electromagnet 31 and the structural member 38 at a predetermined optimal value. For this purpose, there are provided on the lateral wall of the electromagnet 31 a plurality of limit switches 37 for normally or reversely rotating the reduction and lift motor 35 and thereby displacing the electromagnet 31 upwardly or downwardly. Thus, the gap between the electromagnet 31 and the structural member 38 can be automatically adjusted at a given constant value, in spite of the fact that the curvature of the structural member 38 varies along the pass of the vehicle. The magnet vehicle can be removed with ease from the surface of the structural member 38 by simply supporting the magnet vehicle by suitable means such as a crane, or otherwise by switching off the limit switches 37 to their non-operable positions and abutting the yoke 34 of the electromagnet 31 to the structural member 38 and thereby cutting off the electric current and removing the magnetic force exerted by the lateral magnet means 13, 13' to the structural member 38.

Figure 5:
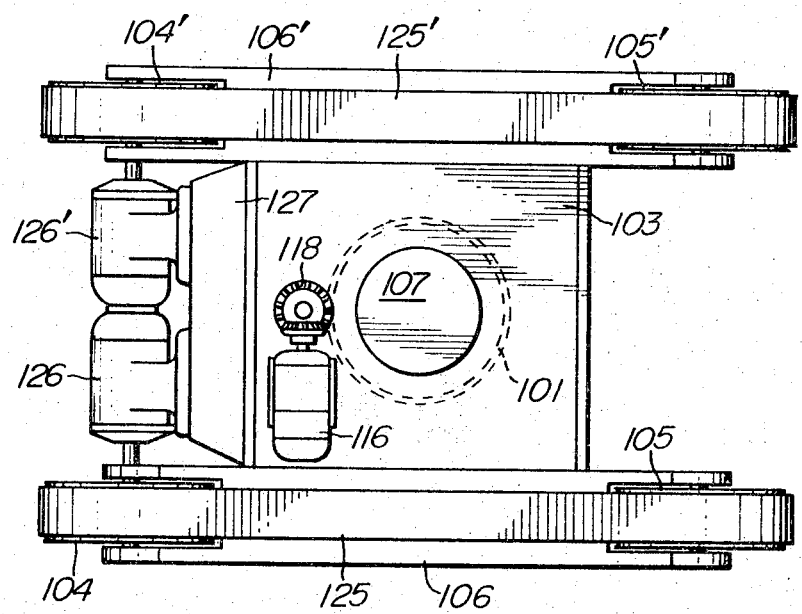
FIG. 5 is a plan view illustrating another embodiment of the magnet vehicle according to the present invention.
Figure 6:
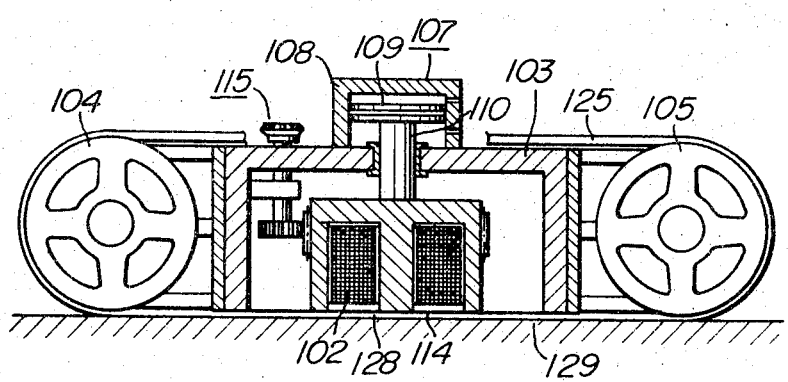
FIG. 6 is a side view illustrating the magnet vehicle of FIG. 5 in its vertical section.

Another preferred embodiment of the present invention will now be described below with reference to FIGS. 5 through 8. In the drawings, 101 is an electromagnet, 102 is a coil for said electromagnet 101, and 103 is a central frame for interlocking and supporting various elements of the vehicle. 104 and 104' are driving wheels 105 and 105' are driven wheels. 106 and 106' are lateral frames. 107 is an air cylinder means for vertically moving the electromagnet 101, and comprises an air cylinder 108 secured to the frame 103, a piston 109 adapted to be slidingly moved within said cylinder 108 and a rod 110 fixed to said piston 109 at one end and to said electromagnet 101 at its opposite end. 111 and 112 are an inlet and an exhaust ports of compressed air used for vertically moving the piston 109, and connected to a pipe respectively. 113 is a bearing in which the rod 110 is slidingly moved. 114 is the lower end portion of the heel piece of the electromagnet 101. 115 is a steering means and it comprises a driving motor 116, bevel gears 117 and 118, a shaft 119 having the bevel gear 118 secured at one end, a spur gear 120 secured at the other end of said shaft 119 and large gear 121 to be engaged with said spur gear 120 and fixedly mounted on the electromagnet 101. 122 is a bearing for the shaft 119 provided in the center frame 103, and 123 is a guide bore for said shaft 119 provided in a bracket 124. 125 and 125' are driving belts wound around the driving wheels 104, 104' and the driven wheels 105, 105', and 126 and 126' are driving motors mounted on a support frame 127 provided in the center frame 103, which motors being arranged to drive the driving wheels 104 and 104', respectively, and accordingly the magnet vehicle can be driven through the rotation of the driving belts 125, 125'. 128 is a gap existing between the surface 129 of a structural member made of iron or steel and the adhesion end 114.

In the arrangement of the present invention, the force for adhering the magnet vehicle to the surface of the structural member is exerted by the electromagnet 101 and permanent magnet means incorporated in the lateral frames 106, 106'. In case that the total weight of the magnet vehicle itself and associating devices mounted thereon is relatively low, it is possible to dispense with the permanent magnet means incorporated in the lateral frames 106, 106', and it is also possible to dispense with the central magnet means and to support the vehicle merely by lateral magnet means.

When driving the magnet vehicle along the wall surface 129, the adhesion end portion 114 of the electromagnet 101 must be adjusted beforehand with respect to its location. Thereafter, the magnet vehicle is brought adjacent to the wall surface 129 of the structural member by the use of appropriate means such as a crane, and then by applying electric current to the electromagnet 101 and energizing the same the magnet vehicle can be firmly supported on the wall surface 129. The entire operation of the magnet vehicle on the wall surface 129 is controlled by a suitable control means.

By the driving the driving wheels 104 and 104' by means of the driving motors 126 and 126', the magnet vehicle is advanced straight. When it is required to alter the direction of travel, compressed air is introduced into the air cylinder means 107 through the port 111 so that the electromagnet 101 fixed at one end of the rod 110 may be lowered downward due to the pressure acted upon the piston 109, to the extent that the adhesion end portion 114 abuts to the surface 129. When the electromagnet is further depressed, the driving belts 126, 126' are at last lifted away from the wall surface 129. The large gear 121 mounted on the electromagnet 101 is arranged such that it can be vertically slided along the teeth of the spur gear 120 with its teeth engaged with those of the spur gear. In the above case, the weight of the magnet vehicle itself and associated devices mounted thereon is supported only by the adhesion force of the electromagnet 101. After this, the steering motor 116 is activated to a desired direction and the spur gear 120 is rotated intermediary of the bevel gear 117 and 118 and shaft 119. As the large gear 121 of the electromagnet 101 can not be rotated relative to the wall surface 129 of the structural member owing to the fact that the vehicle is then being supported by the adhesion end portion 114 away from the wall surface 129, the spur gear 120 is obliged to rotate around the periphery of the large gear 121, whereby the magnet vehicle can alter the direction of its travel as desired. After the vehicle is altered of its direction of travel to a desired direction, the rotation of the vehicle is stopped by switching off the steering motor 116, and at the same time compressed air is introduced into the air cylinder means 107 through the port 112 and discharged from the port 111 so that the piston 109 is lifted upward to the extent that the adhesion end portion 114 of the electromagnet 101 is retracted relative to the under surface of the driving belts 125, 125'. Thereupon, said belts 125, 125' are brought into contact with the wall surface 129 again, and thus the magnet vehicle is ready for advancing straight forward by the aid of the driving motors 126, 126'.

In one embodiment of the magnet vehicle in accordance with the present invention, in which:

external dimensions; width 850 mm × length 1,050 mm × height 380 mm
traveling speed; 10 meters per minute,
electrical capacity of the center magnet; 1.2 KW DC
capacity of driving motors; 1 KW × 2
capacity of reduction motor; 1 KW
weight of the magnet vehicle; 370 kg
gap between the heel pieces 18, 18' of the lateral magnet means 13, 13' and the structural member 38; 3 mm
gap between the yoke 34 of the center magnet means 24 and the structural member 38; 8 mm the adhesion force exerted has been proved to be 1,680 kg, and the vehicle loaded with 50 kg could travel even on a vertical wall of structural member 38 at will. For the purpose of utilizing this magnet vehicle in painting operation for ships, there were installed on the deck of a ship a control board, power source for direct electric current, a pump and a compressor used for painting. Further, there was mounted on the magnet vehicle a spray nozzle for painting. With the arrangement as above, the magnet vehicle was placed on a side wall of a ship having a radius of curvature of 10 meters, and operated by the remote control means installed on the deck of the ship. It has proved from this experiment that the painting according to the magnet vehicle is satisfactory and the surface to be painted was not scarred or damaged at all.

In another embodiment of the magnet vehicle in accordance with the present invention, the arrangement was as follows,

| | |
|---|---|
| electrical capacity of the center magnet | 0.4 KW |
| capacity of the driving motors | 0.75 KW ×2 |
| capacity of the steering motor | 0.4 KW |
| load | 80 kg |
| traveling speed | 15 meters per minute |
| gap between the adhesion end portion and the wall surface | 5 mm |

The magnet vehicle arranged as above was driven along a circular pass of 8-meter radius and it has proved that it takes 3 seconds to alter the direction of travel by 90°. The vehicle could move over the wall surface at will without damaging the same.

Although, in the aforementioned embodiments, flexible endless V-belts or flat belts have been used as driving means, it is of course possible to use such belt as coupled by chain or the like with elastic element of such as reinforced plastic material. Similarly with respect to the central magnet means, it is possible to arrange such that a warm and a warm wheel are secured at one end of the shaft of the electromagnet, or otherwise piston and cylinder means are provided for moving the electromagnet upward and downward by the aid of air pressure or oil pressure. Similarly, in place of springs used for damping purpose in the guide pulley means, any device having damping effect, for example, those in use of air pressure or oil pressure can be employed, Although in the second embodiment the magnet vehicle was operated with the gap between the adhesion end portion and the wall surface always constant, it is possible by adjusting the gap by use of a gap sensor to utilize efficiently the adhesion force according to the circumstances.

According to the magnet vehicle of the present invention, it is possible to dispense with the platform and other devices which have been necessary in case of conventional methods. Further, it is easy to remove the magnet vehicle from the structural member since the vehicle is adhered thereto only by magnetic force, and in addition to this the magnet vehicle can be supported safely upon the structural surface even in case that the electromagnet is not energized. Furthermore, in accordance with the present invention, the magnet vehicle can alter its direction of travel with high reliability even on a considerably restricted operation surface, without damaging same at all, and it has proved that the efficiency of painting operation can be increased by about three times and the expense can be reduced to about one-tenth in comparison with the conventional arts.

Although the present invention has been described with respect to specific details of certain embodiments thereof, it is not intended that such details be limitations on the present invention except insofar as set forth in the following claims.

We claim:

1. A magnet vehicle for operating on the surface of iron or steel bodies, comprising a frame, a pair of endless track means located on opposite sides of said frame adapted to rotate in contact with the surface for frictional driving of the vehicle, lateral magnet means fixedly connected to said frame between the upper run and the lower run of said endless track means, central magnet means disposed centrally of said frame and cooperating with said lateral magnet means to keep the vehicle attracted on the surface by the magnetic force thereof, said central magnet means including means for automatically providing and adjusting the clearance between the central magnet means and the surface to maintain a constant attraction force between the lower end of the central magnet means and the surface, and motor means for driving said endless track means.

2. A magnet vehicle as defined in claim 1, in which said lateral magnet means are comprised of permanent magnets and said central magnet means is comprised of an electromagnet.

3. A magnet vehicle, as defined in claim 1, in which said means for automatically adjusting the clearance includes a screw fixedly connected to the central magnet means and extending to the direction substantially perpendicular to the plane defined by the lower runs of the two endless tracks, a worm wheel having a central bore threaded for engagement with said screw, a worm gear secured fixedly to the frame for engagement with said worm wheel, and drive means for rotating the worm gear and thereby displacing the central magnet means via said worm wheel and screw in the direction perpendicular to said plane.

4. A magnet vehicle as defined in claim 3, in which said means for automatically adjusting the clearance includes limit switch means attached to the lower portion of a yoke in which the coil of said central magnet means is mounted, for automatically activating said drive means to adjust the clearance between the lower end of the central magnet means and the surface so as to maintain a constant predetermined magnetic attraction force therebetween.

5. A magnet vehicle as defined in claim 1, in which said motor means comprises a pair of motors each adapted to independently drive one of said pair of endless track means.

6. A magnet vehicle for operating on the surface of iron or steel bodies comprising a frame, a pair of lateral magnet means fixedly disposed on opposite sides of said frame at a distance from the surface adapted to magnetically attract the vehicle to the surface, a pair of endless track means each surrounding one of said lateral magnet means adapted to rotate with respect thereto in contact with the surface to frictionally drive the vehicle, central magnet means disposed centrally of said frame and cooperating with said lateral magnetic means to keep the vehicle attracted on the surface by the magnetic force thereof, said central magnet means including means for automatically providing and adjusting the clearance between the central magnet means and the surface to maintain a constant attraction force between the lower end of the central magnet means and the surface, and motor means for driving said endless track means.

* * * * *